(12) United States Patent
Yang et al.

(10) Patent No.: US 8,849,084 B2
(45) Date of Patent: Sep. 30, 2014

(54) SINGLE MODE OPTICAL FIBER

(75) Inventors: Chen Yang, Wuhan (CN); Beibei Cao, Wuhan (CN); Su Chen, Wuhan (CN); Weijun Tong, Wuhan (CN); Xianyuan Ni, Wuhan (CN); Jie Luo, Wuhan (CN)

(73) Assignee: Yangze Optical Fibre and Cable Company Ltd., Wuhan, Hubei (CN)

( * ) Notice: Subject to any disclaimer, the term of this patent is extended or adjusted under 35 U.S.C. 154(b) by 0 days.

(21) Appl. No.: 14/008,781

(22) PCT Filed: Nov. 16, 2011

(86) PCT No.: PCT/CN2011/082254
§ 371 (c)(1),
(2), (4) Date: Sep. 30, 2013

(87) PCT Pub. No.: WO2012/149818
PCT Pub. Date: Nov. 8, 2012

(65) Prior Publication Data
US 2014/0248026 A1    Sep. 4, 2014

(30) Foreign Application Priority Data

May 5, 2011    (CN) .......................... 2011 1 0114732

(51) Int. Cl.
G02B 6/02      (2006.01)
G02B 6/36      (2006.01)
G02B 6/00      (2006.01)
G02B 6/036     (2006.01)
G02B 6/12      (2006.01)

(52) U.S. Cl.
CPC ...... *G02B 6/036* (2013.01); *G02B 2006/12035* (2013.01)
USPC ............................................ 385/127; 65/415

(58) Field of Classification Search
USPC ............ 385/125–131, 141; 65/415, 416, 417, 65/419, 428
See application file for complete search history.

(56) References Cited

U.S. PATENT DOCUMENTS 4,641,917 A * 2/1987 Glodis et al. .................. 385/127
5,032,001 A * 7/1991 Shang .......................... 385/127

(Continued)

FOREIGN PATENT DOCUMENTS

| CN | 101883998 A | 11/2010 |
| CN | 102043196 A | 5/2011 |
| CN | 102156323 A | 8/2011 |

OTHER PUBLICATIONS

State Intellectual Property Office of the People's Republic of China (ISA/CN), "Written Opinion of the International Search Authority", China, Mar. 1, 2012.

(Continued)

*Primary Examiner* — Akm Enayet Ullah
(74) *Attorney, Agent, or Firm* — Tim Tingkang Xia, Esq.; Morris, Manning & Martin, LLP (57) ABSTRACT

A low attenuation single mode optical fiber includes a core layer and claddings. The core layer has the relative refractive index difference (RRID) $\Delta 1$ ranging from −0.1% to +0.1% and the radius R1 ranging from 4.0 μm to 6.0 μm. The claddings have three claddings layers surrounding the core layer. The RRID of the first cladding layer $\Delta 2$ ranges from −0.2% to −0.6%, and the radius R2 thereof ranges from 10 μm to 22 μm. The RRID of the second cladding layer $\Delta 3$ is less than $\Delta 2$. The RRID and radius of the first cladding layer and the RRID and radius of the second cladding layer satisfy the relationship of: V=($\Delta 2 - \Delta 3$)×(R3−R2), and the value of V ranges from 0.15% μm to 0.8% μm. The third cladding layer is all the layers that closely surround the second cladding layer, and the RRID of each layer is greater than $\Delta 3$.

18 Claims, 4 Drawing Sheets

(56) References Cited

U.S. PATENT DOCUMENTS

| | | | | |
|---|---|---|---|---|
| 5,044,724 | A * | 9/1991 | Glodis et al. | 385/127 |
| 7,164,835 | B2 * | 1/2007 | Matsuo et al. | 385/127 |
| 7,623,747 | B2 * | 11/2009 | De Montmorillon et al. | 385/126 |
| 7,680,381 | B1 * | 3/2010 | Bookbinder et al. | 385/127 |
| 7,995,889 | B2 * | 8/2011 | de Montmorillon et al. | 385/124 |
| 8,428,415 | B2 * | 4/2013 | Chen et al. | 385/128 |
| 2010/0178504 | A1 * | 7/2010 | Chen et al. | 428/391 |
| 2010/0195966 | A1 * | 8/2010 | Bickham et al. | 385/128 |
| 2011/0064368 | A1 | 3/2011 | Bookbinder et al. | |
| 2011/0085770 | A1 * | 4/2011 | Bigot-Astruc et al. | 385/123 |

OTHER PUBLICATIONS

The International Bureau of WIPO, "International Preliminary Report on Patentability", Switzerland, Nov. 5, 2013.
State Intellectual Property Office of the People's Republic of China, "Office Action", China, Jan. 18, 2012.
State Intellectual Property Office of the People's Republic of China, "International Search Report", China, Mar. 1, 2012.

* cited by examiner

SINGLE MODE OPTICAL FIBER

FIELD OF THE INVENTION

The present invention relates generally to the field of optical communications, and more particularly, to a low-attenuation single-mode optical fiber usable for an optical fiber communication system. The optical fiber has improved anti-bending performance and a low optical fiber loss.

BACKGROUND OF THE INVENTION

With the possession of advantages such as a fast transmission speed, a large information carrying capacity, and a long transmission distance, a single-mode optical fiber has been massively applied in the construction of optical fiber communication networks. With further development of an optical amplification technology and a wavelength division multiplexing technology, an optical fiber communication system continuously develops forward toward a direction of higher transmission power and a longer transmission distance. As an important transmission medium in the optical fiber communication system, the single-mode optical fiber needs to be further improved in aspects of relevant performance indexes, so as to meet requirements of the optical fiber communication system in actual development. An attenuation coefficient and an effective area of an optical fiber are two important performance indexes of the single-mode optical fiber. The smaller the attenuation coefficient of the optical fiber is, the longer the transmission distance of an optical signal carried thereby is. The larger the effective area of the optical fiber is, the weaker the nonlinear effects of the optical fiber are. A large effective area can effectively suppress the nonlinear effects, such as self-phase modulation, four-wave mixing, and cross-phase modulation, so as to ensure the transmission quality of a high-power optical signal. A reduced attenuation coefficient and an enlarged effective area can effectively increase an optical-signal-to-noise ratio (OSNR) in the optical fiber communication system, so as to further improve the transmission quality and increase the transmission distance of the system.

In an optical fiber material, light scattering caused by non-uniformity forms a scattering loss of an optical fiber. Rayleigh scattering of an optical fiber is one of three scattering mechanisms and is linear scattering (which is irrelevant to the frequency of an optical signal). The Rayleigh scattering is characterized in that the magnitude thereof is in reverse proportion to the biquadrate of the wavelength thereof and the loss caused thereby is related to the type and concentration of a doped material. Generally, the lower the concentration of the doped material is, the smaller the loss caused by the Rayleigh scattering is. A "pure silicon core" optical fiber is an optical fiber with an undoped core layer portion (that is, pure silica quartz glass). Theoretically, the Rayleigh scattering of the pure silicon core optical fiber is very similar to intrinsic Rayleigh scattering of a pure quartz glass material, so that the Rayleigh scattering of the pure silicon core optical fiber also significantly reduces the attenuation coefficient of the optical fiber. Meanwhile, by optimizing parameters, such as a diameter of a core layer and a doping concentration of fluorine (F) in a cladding, the optical fiber is provided with a larger effective area. However, generally, a large effective area significantly increases a bending loss of the optical fiber (which includes a macro-bending loss and a micro-bending loss of the optical fiber), especially in a long-wavelength area. In a cabling process, or an actual laying and using process of the optical fiber, if the anti-bending performance of the optical fiber cannot meet the requirement, the loss of a signal is increased, and the transmission quality of the signal cannot be ensured.

In the U.S. Pat. No. 6,917,740, a pure silicon core single-mode optical fiber having improved material viscosity mismatch and a manufacturing method thereof are described. By doping a core layer with chlorine (Cl) and F, a difference value between glass transition temperatures Tg of the core layer and that of a cladding is reduced to less than 200° C., thereby optimizing the attenuation performance of the optical fiber. This patent neither concerns studies and improvements on the bending performance of the optical fiber, nor concerns the optical transmission performance of the optical fiber.

In the U.S. Pat. No. 6,449,415, disclosed is an optical fiber, a core layer of which is doped with Cl and has a relative refractive index difference being a positive value, and a cladding of which is doped with F and has a relative refractive index difference being a negative value, and the optical fiber has the structure that an inner cladding is a depressed cladding. A Cl-doped material of the core layer can effectively reduce mismatch between a core layer material and a cladding material of the optical fiber and reduce additional stress produced in a wire drawing process. Meanwhile, the structure that the inner cladding is a depressed cladding can improve the bending performance of the optical fiber, yet the structure of the depressed cladding has a limited capability in improving the bending performance, and also influences other optical parameters of the optical fiber, for example, a mode field diameter and a cutoff wavelength of the optical fiber. Besides, in a situation that parameters of an outer cladding are unreasonably designed, the depressed inner cladding structure may cause a leakage problem of an LP01 mode (that is, an attenuation coefficient of the single-mode optical fiber is dramatically increased in a long-wavelength area).

In the U.S. Pat. No. 6,947,650, a pure silicon core optical fiber having an F-doped depressed inner cladding is presented, a ratio D/d of a diameter D of the depressed cladding thereof to a diameter d of a core layer is about 8.5 and is in a range less than 10. A ratio of an operating wavelength $\lambda op$ of the optical fiber to a cutoff wavelength $\lambda cut$ of the optical fiber ranges from 1.0 to 1.2. This patent does not describe the performance of the optical fiber, such as attenuation and bending.

Generally, the bending performance of the optical fiber can be improved by the following methods. A first method is to change an MAC value of the optical fiber (that is, a ratio of a mode field diameter to a cutoff wavelength of the optical fiber). The smaller the MAC value is, the better the anti-bending performance of the optical fiber is. However, as the mode field diameter is reduced, the effective area is also reduced, and meanwhile, the cutoff wavelength of the optical fiber must be less than the operating wavelength, so as to ensure a single-mode operating characteristic. Therefore, the room for improving the bending performance of the optical fiber by changing the MAC value of the optical fiber is limited. In a second method, the bending performance can be improved through a double-cladding structure with an inner cladding being a depressed cladding, but a depressed cladding may cause a phenomenon of "leakage in the LP01 mode" to the optical fiber. In a third method, a depressed cladding similar to a trench is added on an inner cladding of the optical fiber, so that a large mode field diameter is ensured, and meanwhile, the bending performance of the optical fiber is improved. This method is widely applied in a bend-insensitive single-mode optical fiber (that is, a G.657 optical fiber), for example, in Chinese Patent No. CN101598834A, U.S. Pat. No. 7,450,807, and European Patent No. EP1978383. It is not found in any relevant patent or document report that a depressed cladding similar to a trench is adopted in a pure silicon core optical fiber to further improve the bending performance of the optical fiber.

Generally, a dopant changes a relative refractive index difference of quartz glass. Dopants, such as germanium (Ge), Cl, and phosphorus (P), can make the relative refractive index difference of the doped quartz glass a positive value, and are referred to as "positive dopants". Dopants, such as F and boron (B), can make the relative refractive index difference of the doped quartz glass a negative value, and are referred to as "negative dopants". If one "positive dopant" and one "negative dopant" are simultaneously used to dope the quartz glass, the relative refractive index difference of the doped quartz glass may be a positive value, a negative value, or 0.

Therefore, a heretofore unaddressed need exists in the art to address the aforementioned deficiencies and inadequacies.

SUMMARY OF THE INVENTION

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that the same thing can be said in more than one way. Consequently, alternative language and synonyms may be used for any one or more of the terms discussed herein, nor is any special significance to be placed upon whether or not a term is elaborated or discussed herein.

The term "refractive index profile", as used herein, refers to a relationship between a refractive index of glass in an optical fiber and a radius of the optical fiber.

As used herein, the term "relative refractive index difference" is defined by $$\Delta = \left[\frac{(n_i^2 - n_0^2)}{2n_i^2}\right] \times 100\% \approx \frac{n_i - n_0}{n_0} \times 100\%,$$

where $n_i$ and $n_0$ are respectively a refractive index of each corresponding portion and a refractive index of pure silica quartz glass.

The term, "contribution amount of F: refers to a relative refractive index difference ($\Delta F$) of F-doped quartz glass relative to pure silica quartz glass, which is used for representing the doping amount of F.

One of the objectives of the present invention is to provide a low-attenuation single-mode optical fiber with a reasonably designed refractive index profile and further improved anti-bending performance, in order to solve the technical problems in view of the deficiencies in the prior art.

In one aspect of the present invention, the single-mode optical fiber includes a core layer and claddings surrounding the core layer.

In one embodiment, a relative refractive index difference $\Delta 1$ of the core layer ranges from −0.1% to +0.1%, and a radius R1 of the core layer ranges from 4.0 μm to 6.0 μm.

In one embodiment, the claddings surrounding the core layer comprises a first cladding layer, a second cladding layer, and a third cladding layer. The first cladding layer immediately surrounds the core layer, and has a relative refractive index difference $\Delta 2$ ranging from −0.2% to −0.6%, and a radius R2 ranging from 10 μm to 22 μm. The second cladding layer immediately surrounds the first cladding layer, and has a relative refractive index difference $\Delta 3$ being less than $\Delta 2$, and wherein the relative refractive index difference $\Delta 2$ and the radius R2 of the first cladding layer and the relative refractive index difference $\Delta 3$ and a radius R3 of the second cladding layer satisfy the relationship of V=($\Delta 2-\Delta 3$)×(R3−R2), wherein a value of V ranges from 0.15% μm to 0.8% μm. The third cladding layer comprises one or more sub-layers immediately surrounding the second cladding layer, and wherein a relative refractive index difference of each sub-layer of the third cladding layer is greater than $\Delta 3$.

In one embodiment, the relative refractive index difference $\Delta 3$ of the second cladding layer ranges from −0.3% to −0.7%, and the radius R3 of the second cladding layer ranges from 13 μm to 27.5 μm. A radius of the outermost sub-layer of the third cladding layer is R4, ranging from 36 μm to 63 μm.

In one embodiment, the core layer is formed by quartz glass doped with fluorine (F) or quartz glass doped with F and another dopant, and wherein a contribution amount of the F in the core layer ranges from −0.1% to 0%.

In one embodiment, the first cladding layer is formed by quartz glass doped with F, wherein a ratio R2/R1 of the radius R2 of the first cladding layer to the radius R1 of the core layer ranges 2 to 4, and a difference value ($\Delta 1-\Delta 2$) between the relative refractive index difference $\Delta 2$ of the first cladding layer and the relative refractive index difference $\Delta 1$ of the core layer ranges from 0.3% to 0.45%.

In one embodiment, the second cladding layer is formed by quartz glass doped with F, and the relative refractive index difference $\Delta 3$ of the second cladding layer is less than that of the other cladding layers.

In one embodiment, the third cladding layer comprises one sub-layer formed of a quartz glass layer doped with F or another dopant, and wherein a relative refractive index difference $\Delta 4$ of the third cladding layer ranges from −0.25% to −0.45%.

In one embodiment, the third cladding layer comprises two sub-layers, wherein the inner sub-layer is an F-doped sub-layer with a relative refractive index difference $\Delta 4$ ranging from −0.25% to −0.45% and a radius ranging from 36 μm to 54 μm, and wherein the outer sub-layer is a pure silicon sub-layer with a relative refractive index difference being 0%.

In one embodiment, an attenuation coefficient of the optical fiber at a wavelength of 1550 nm is less than or equal to 0.180 dB/km, and a mode field diameter of the optical fiber ranges from 10 μm to 13 μm.

In one embodiment, the optical fiber has an optical fiber cutoff wavelength less than or equal to 1530 nm. At a wavelength of 1550 nm, an added loss for one round of bending at a bending radius of 10 mm is less than or equal to 0.5 dB, and an added loss for ten rounds of bending at a bending radius of 15 mm is less than or equal to 0.2 dB. At a wavelength of 1625 nm, an added loss for one round of bending at a bending radius of 10 nun is less than or equal to 1.0 dB, and an added loss for ten rounds of bending at a bending radius of 15 mm is less than or equal to 0.8 dB.

In one embodiment, a micro-bending loss of the optical fiber at 1700 nm is less than or equal to 0.8 dB/km.

The invention, among other things, has the following beneficial effects.

(1) The second cladding layer having the minimum relative refractive index difference can effectively constrain an optical signal in the fiber core for propagation, and can effectively prevent the optical signal from leaking outward in a bent state, so as to ensure the anti-bending performance of the optical fiber which includes the anti-macro-bending performance and the anti-micro-bending performance of the optical fiber.

After the mode field diameter of the optical fiber is increased, an effective area thereof is also increased accordingly. However, as an MAC value is increased, the anti-bending performance thereof deteriorates. While providing the optical fiber with a large effective area, the second cladding layer can still maintain good bending performance, thereby ensuring the performance of the optical fiber after the cabling in actual application.

(2) The core layer is at least doped with F, so that the viscosity of the core layer material is reduced, the situation of viscosity mismatch between the core layer and the cladding is alleviated accordingly, and residual stress in the optical fiber after wire drawing is reduced, which is favorable for improving the attenuation performance of the optical fiber.

(3). The contribution amount $\Delta F$ of the doped F in the F-doped sub-layer of the third cladding layer is less than −0.25%, so as to ensure that the phenomenon of "leakage in the LP01 mode" is avoided, and since the viscosity thereof is greater than that of the second cladding layer, the third cladding layer material with the higher viscosity bears a larger proportion of wire drawing tension during the wire drawing; in this way, the stress caused by the wire drawing tension can be effectively prevented from being concentrated on the fiber core portion, thereby avoiding increase of the attenuation of the optical fiber.

These and other aspects of the present invention will become apparent from the following description of the preferred embodiment taken in conjunction with the following drawings, although variations and modifications therein may be affected without departing from the spirit and scope of the novel concepts of the invention

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DESCRIPTION OF EMBODIMENTS OF THE INVENTION

The present invention is more particularly described in the following examples that are intended as illustrative only since numerous modifications and variations therein will be apparent to those skilled in the art. Various embodiments of the invention are now described in detail in conjunction with the accompanying drawings. Referring to the drawings, like numbers indicate like components throughout the views.

In accordance with the purposes of this invention, as embodied and broadly described herein, this invention, in one aspect, relates to a low-attenuation single-mode optical fiber with a reasonably designed refractive index profile and further improved anti-bending performance.

Figure 1:
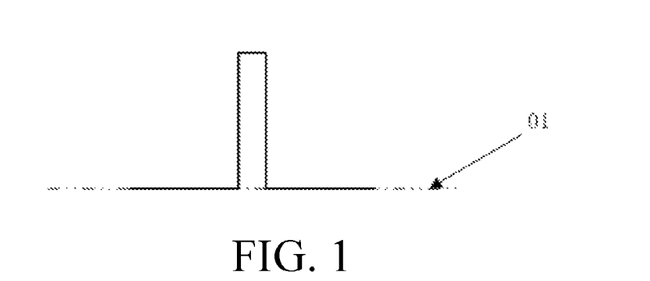
FIG. 1 is a schematic view of a refractive index profile of a single-mode optical fiber with a Ge-doped core layer and a matched cladding, where a dotted line corresponding to 01 is a relative refractive index difference of pure quartz glass (that is, the value thereof is 0%).
Figure 2:
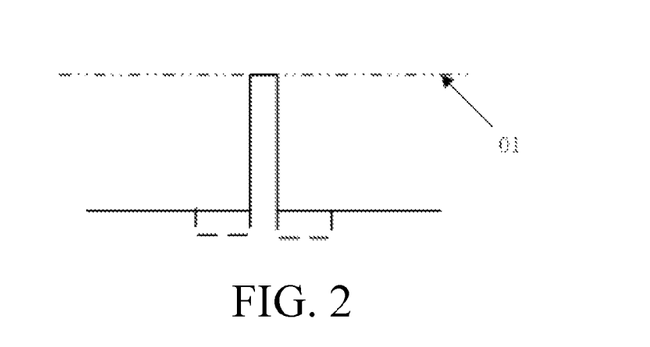
FIG. 2 is a schematic view of a refractive index profile of an optical fiber with a pure silicon core, where a dotted line represents that the optical fiber includes the structure that an inner cladding layer is a depressed cladding layer.
Figure 3:
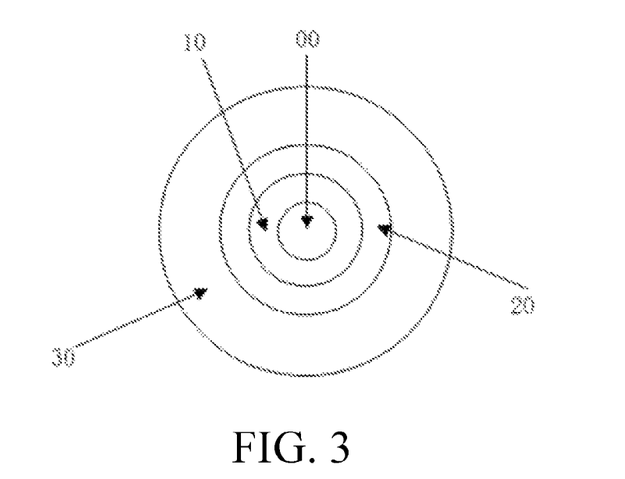
FIG. 3 is a schematic view of a radial cross section of a single-mode optical fiber according to one embodiment of the present invention, where reference 00 refers to a core layer of the optical fiber, reference 10 refers to a first cladding layer of the optical fiber, reference 20 refers to a second cladding layer of the optical fiber, and reference 30 refers to a third cladding layer of the optical fiber.
Figure 4:
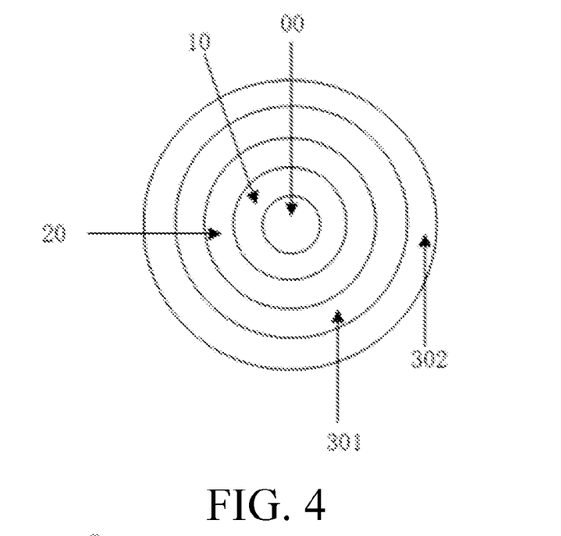
FIG. 4 is a schematic view of a radial cross section of a single-mode optical fiber according to another embodiment of the present invention, where reference 301 refers to an inner F-doped sub-layer of a third cladding layer, and reference 302 refers to an outer pure silicon sub-layer.
Figure 5:
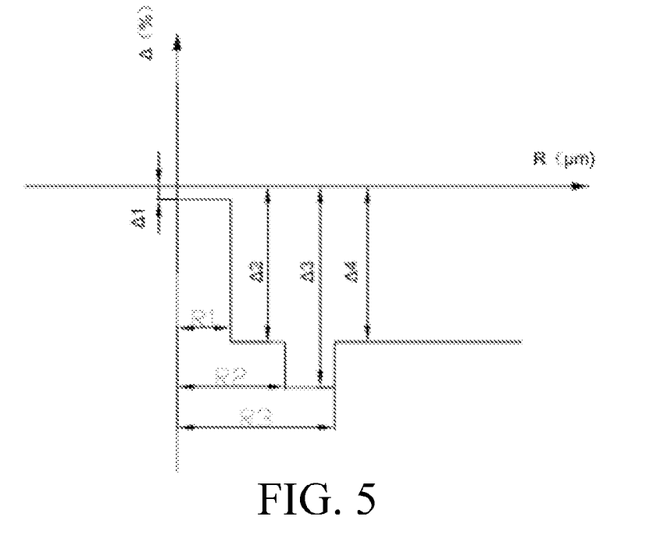
FIG. 5 is a schematic view of a refractive index profile of a single-mode optical fiber according to one embodiment of the present invention.
Figure 6:
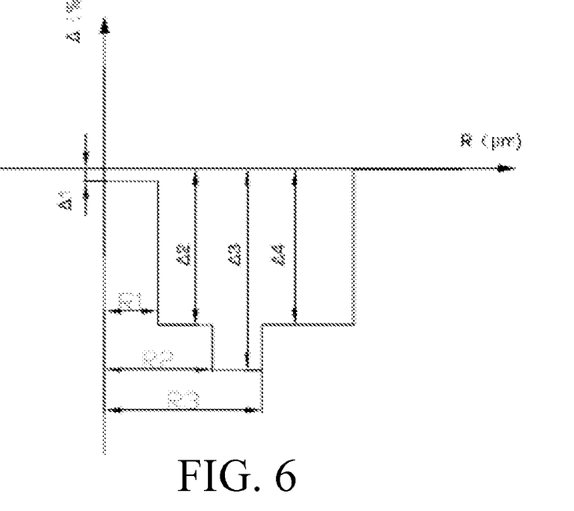
FIG. 6 is a schematic view of a refractive index profile of a single-mode optical fiber according to another embodiment of the present invention.
Figure 7:
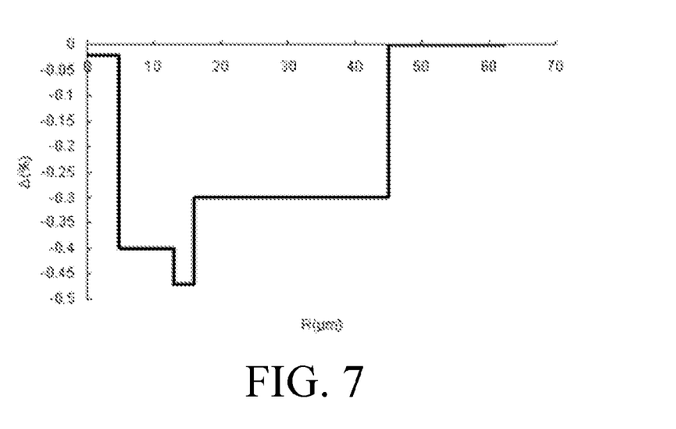
FIG. 7 and FIG. 8 are respectively a view of a refractive index profile of a single-mode optical fiber according to Embodiment 11 of the present invention and a view of an F doping profile thereof.
Figure 8:
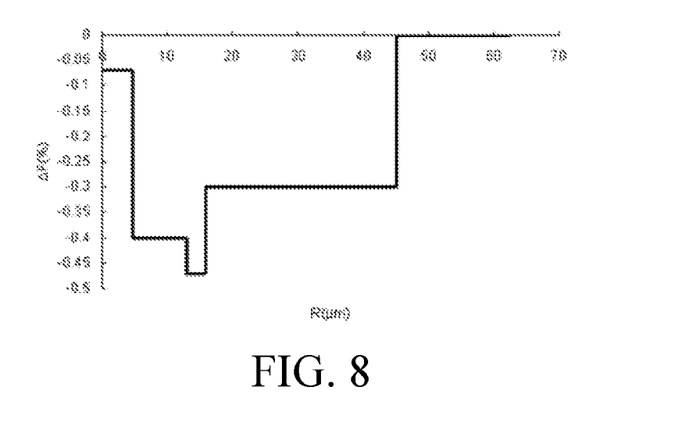
Figure 9:
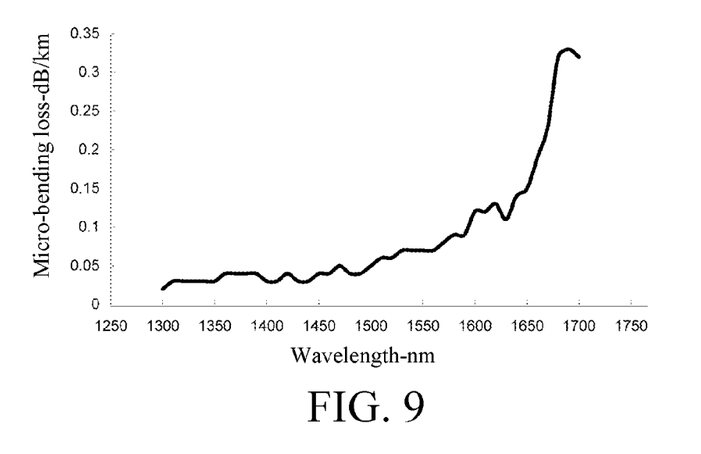
FIG. 9 is a micro-bending loss spectrum of an optical fiber according to an embodiment of the present invention.
Figure 10:
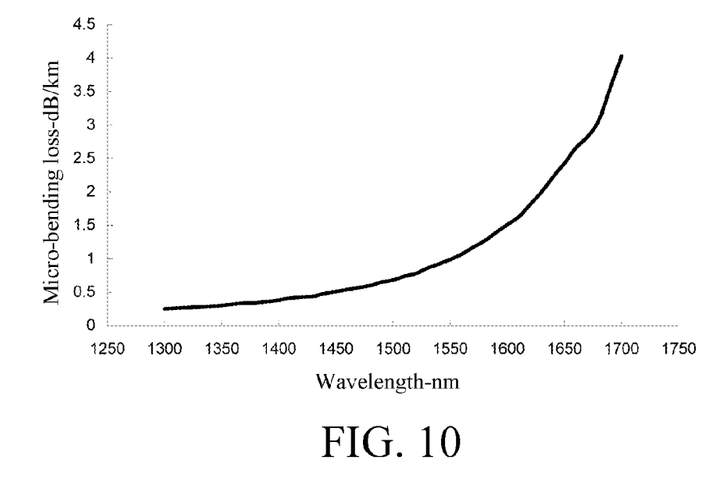
FIG. 10 is an example of a micro-bending loss spectrum of a pure silicon core optical fiber.

Referring to FIGS. 3 and 4, the optical fiber having a core layer and claddings surrounding the core layer is shown according to one embodiment of the invention. The core layer 00 is formed by quartz glass doped with F or quartz glass doped with F and another dopant. The core layer is surrounded by three cladding layers. A first cladding layer 10 immediately surrounds the core layer and is formed by quartz glass doped with F. A second cladding layer 20 immediately surrounds the first cladding layer and is formed by quartz glass doped with F, and a relative refractive index difference $\Delta 3$ thereof is less than that of another cladding. A third cladding layer 30 includes one or more sub-layers that immediately surround the second cladding layer. A relative refractive index difference of each sub-layer of the third cladding layer 30 is greater than $\Delta 3$. A radius of the outermost sub-layer of the third cladding layer 30 is R4, where R4 ranges from 36 μm to 63 μm. In the embodiment shown in FIG. 3, the third cladding layer 30 includes one sub-layer formed of a quartz glass layer doped with F or another dopant. In another embodiment shown in FIG. 4, the third cladding layer 30 includes two sub-layers, where the inner sub-layer is an F-doped sub-layer 301 with a radius ranging from 36 μm to 54 μm, and the outer sub-layer is a pure silicon sub-layer 302 with a relative refractive index difference being 0%.

According to the embodiments of the invention, parameters of the single-mode optical fiber are designed in a range specified thereby, and a core rod is manufactured according to a design requirement of the optical fiber through a core rod manufacturing process, such as the well known PCVD process, MCVD process, OVD process or VAD process. An entire preform rod is manufactured through a cladding process such as a sleeving process, the OVD process, or the VAD process. The PCVD process has certain advantages when a high concentration of F is doped.

A refractive index profile of the drawn optical fiber is tested by using an NR-9200 device (EXFO), and major parameters of the refractive index profile and a doped material of the optical fiber are shown in Table 1-a and Table 1-b.

For a method of testing a macro-bending added loss, reference can be made to the method specified in IEC 60793-1-47. Since a longer wavelength is more sensitive to bending, bending added losses of the optical fiber at the wavelengths of 1550 nm and 1625 nm are mainly tested to accurately assess the bending sensitivity of the optical fiber in a range of all wave bands (especially the L band). The optical fiber is wound into one round or ten rounds at a certain diameter and is then released, and a change of optical power before and after the round/rounds is/are formed through the winding is detected, and is used as a macro-bending added loss of the optical fiber.

For a method of detecting a micro-bending loss, reference can be made to a method in Method B specified in IEC TR 62221-2001. Since a longer wavelength is more sensitive to bending, a test wavelength ranges from 1300 nm to 1700 nm, and emphasis is placed on the magnitude of a micro-bending loss of the optical fiber at a wavelength more than 1550 nm.

Major performance parameters of the invented optical fiber are shown in Table 2.

It can be seen from the embodiments that a value of V and a value of ($\Delta 1-\Delta 2$) have obvious influence on the bending performance of the optical fiber. For example, in a situation reflected by the embodiments 5 and 6 and the embodiments 3 and 4, greater values of the V and the ($\Delta 1"\Delta 2$) mean that the optical fiber has better anti-bending performance. A contribution amount of F in the core layer influences the attenuation performance of the optical fiber. When $\Delta 1$ is a fixed value, if the contribution amount of F in the core layer is increased, it means that a concentration of a "positive dopant" in the core layer needs to be correspondingly increased to keep the $\Delta 1$ unchanged, and as the concentration of the dopant is increased, the viscosity of the core layer material is further reduced, so that a viscosity match degree between the core layer material and the cladding material is increased, which is favorable for improving the attenuation performance of the optical fiber, for example, a situation reflected by the embodiments 1 and 2. A contribution amount $\Delta F$ of F in the third cladding layer also influences the attenuation performance of the optical fiber, for example, a situation reflected by the embodiments 7, 8, and 9. A higher doping concentration of F reduces a relative refractive index difference of an F-doped sub-layer, which is favorable for further avoiding the phenomenon of "leakage in the LP01 mode" of the optical fiber. However, a higher doping concentration of F also means that the viscosity of the cladding is further reduced, which is unfavorable for the cladding to bear wire drawing tension in a wire drawing process, so that more stress is concentrated on a fiber core portion of the optical fiber, resulting in an unfavorable effect on the attenuation, so that the doping amount of F in the third cladding layer needs to be comprehensively considered. Meanwhile, if the third cladding layer includes an inner F-doped sub-layer and an outer pure silicon sub-layer, the positioning of the outer pure silicon sub-layer needs to be considered, so that the sub-layer does not cause "leakage in the LP01 mode" of the optical fiber. Meanwhile, a sufficient thickness needs to be maintained, so that the sub-layer bears a portion of the wire drawing tension in the wire drawing process, avoiding concentration of stress on the fiber core portion of the optical fiber. In the embodiments 10, 11, and 12, the third cladding layer of the optical fiber is divided into an inner F-doped sub-layer and an outer pure silicon sub-layer. It can be seen from the data in Table 2 that when an inner diameter D4* of a ring where the outer pure silicon sub-layer lies is large enough, the phenomenon of "leakage in the LP01 mode" of the optical fiber is avoided, and meanwhile this layer of material can effectively bear a portion of the wire drawing tension, so that stress is not obviously concentrated on the fiber core portion of the optical fiber and the attenuation performance of the optical fiber is improved.

The experiments show that a mode field diameter of an optical fiber manufactured according to the technical solution of present invention can reach a value above 10 μm at 1550 nm, a cutoff wavelength of the optical fiber is ensured to be less than 1530 nm, an attenuation coefficient at 1550 nm is ensured to be less than 0.180 dB/km, and the optical fiber has good anti-bending performance that includes good anti-macro-bending performance and anti-micro-bending performance. For the optical fiber, at a wavelength of 1550 nm, an added loss for one round of bending at a bending radius of 10 mm is less than or equal to 0.5 dB, and an added loss for ten rounds of bending at a bending radius of 15 mm is less than or equal to 0.2 dB; at a wavelength of 1625 nm, an added loss for one round of bending at a bending radius of 10 mm is less than or equal to 1.0 dB, and an added loss for ten rounds of bending at a bending radius of 15 mm is less than or equal to 0.8 dB. Meanwhile, a micro-bending loss of the optical fiber at 1700 nm is less than 0.8 dB/km.

TABLE 1-a structure and material composition of an optical fiber

| | Core layer | | | First cladding layer | | | | Second cladding layer | | | Third cladding layer | |
| --- | --- | --- | --- | --- | --- | --- | --- | --- | --- | --- | --- | --- |
| Serial number | Radius R1 (μm) | Relative refractive index difference Δ1 (%) | Contribution amount of F: ΔF (%) | Radius R2 (μm) | Relative refractive index difference Δ2 (%) | R2/R1 | Δ1 − Δ2 | Radius R3 (μm) | Relative refractive index difference Δ3 (%) | Value of V (% μm) | Radius R4 (μm) | Relative refractive index difference Δ4 (%) |
| 1 | 4.1 | −0.02 | −0.06 | 12.8 | −0.38 | 3.1 | 0.36 | 17 | −0.53 | 0.63 | 52.4 | −0.28 |
| 2 | 4 | −0.03 | −0.11 | 13 | −0.4 | 3.3 | 0.37 | 14 | −0.54 | 0.14 | 42.1 | −0.3 |
| 3 | 5 | 0.01 | −0.03 | 10 | −0.36 | 2.0 | 0.37 | 13 | −0.55 | 0.57 | 55.6 | −0.25 |
| 4 | 4.9 | 0.05 | −0.04 | 11.5 | −0.37 | 2.3 | 0.42 | 23 | −0.61 | 2.76 | 62.3 | −0.27 |
| 5 | 5.8 | 0.03 | −0.05 | 20 | −0.36 | 3.4 | 0.39 | 25 | −0.49 | 0.65 | 62.2 | −0.35 |
| 6 | 5.5 | 0.01 | −0.06 | 21 | −0.38 | 3.8 | 0.39 | 23 | −0.48 | 0.20 | 62.7 | −0.35 |
| 7 | 4.8 | −0.03 | −0.07 | 14 | −0.39 | 2.9 | 0.36 | 20 | −0.57 | 1.08 | 62.3 | −0.25 |
| 8 | 4.7 | −0.02 | −0.07 | 12 | −0.4 | 2.6 | 0.38 | 19 | −0.63 | 1.61 | 62.5 | −0.3 |
| 9 | 4.9 | −0.03 | −0.07 | 14 | −0.41 | 2.9 | 0.38 | 20 | −0.54 | 0.78 | 62.4 | −0.35 |
| 13 | 5.2 | −0.10 | −0.10 | 17 | −0.42 | 3.3 | 0.31 | 30 | −0.48 | 0.78 | 62.3 | −0.33 |
| 14 | 4.3 | −0.03 | −0.09 | 18 | −0.48 | 4.2 | 0.45 | 28 | −0.73 | 2.50 | 62.5 | −0.29 |

TABLE 1-b

Structure and material composition of an optical fiber

| | Core layer | | | First cladding layer | | | | Second cladding layer | | | Third cladding layer | | |
|---|---|---|---|---|---|---|---|---|---|---|---|---|---|
| Serial number | Radius R1 (μm) | Relative refractive index difference Δ1 (%) | Contribution amount of F: ΔF (%) | Radius R2 (μm) | Relative refractive index difference Δ2 (%) | R2/R1 | Δ1 − Δ2 | Radius R3 (μm) | Relative refractive index difference Δ3 (%) | Value of V (% μm) | D4* (μm) | D4 (μm) | Relative refractive index difference Δ4* (%) |
| 10 | 4.9 | 0.01 | −0.06 | 13.5 | −0.38 | 2.76 | 0.39 | 17 | −0.44 | 0.21 | 80 | 124.8 | −0.29 |
| 11 | 4.8 | −0.02 | −0.07 | 13 | −0.4 | 2.71 | 0.38 | 16 | −0.47 | 0.21 | 90 | 125 | −0.3 |
| 12 | 5 | −0.01 | −0.07 | 13.4 | −0.41 | 2.68 | 0.40 | 17 | −0.47 | 0.22 | 108 | 124.9 | −0.3 |

Note 1:
D4* represents a diameter of an inner F-doped sub-layer of the third cladding layer, and D4 represents a diameter of an outermost pure silicon sub-layer of the third cladding layer.
Note 2:
Δ4* represents a relative refractive index difference of the inner F-doped sub-layer of the third cladding layer.

TABLE 2

Major performance parameters of an optical fiber

| | | | | | | Bending added loss at 1550 nm (dB/round) | | Bending added loss at 1625 nm (dB/round) | |
|---|---|---|---|---|---|---|---|---|---|
| Serial number | Mode field diameter (μm)@1550 nm | Optical fiber cutoff wavelength (nm) | Diameter of the optical fiber (μm) | Attenuation coefficient (dB/km)@1550 nm | Micro-bending loss (dB/km)@1700 nm | R10 mm | R15 mm | R10 mm | R15 mm |
| 1 | 10.2 | 1230 | 124.8 | 0.177 | 0.7 | 0.4 | 0.015 | 0.68 | 0.06 |
| 2 | 10.1 | 1220 | 124.2 | 0.172 | 0.68 | 0.41 | 0.014 | 0.66 | 0.05 |
| 3 | 11.2 | 1340 | 125.2 | 0.176 | 0.6 | 0.23 | 0.01 | 0.35 | 0.035 |
| 4 | 11.3 | 1335 | 124.6 | 0.175 | 0.45 | 0.13 | 0.006 | 0.25 | 0.02 |
| 5 | 12.7 | 1525 | 124.4 | 0.175 | 0.4 | 0.18 | 0.011 | 0.36 | 0.03 |
| 6 | 12.1 | 1500 | 125.4 | 0.174 | 0.2 | 0.08 | 0.003 | 0.14 | 0.007 |
| 7 | 11.3 | 1295 | 124.6 | 0.177 | 0.4 | 0.22 | 0.011 | 0.33 | 0.03 |
| 8 | 11.2 | 1280 | 125 | 0.173 | 0.35 | 0.21 | 0.01 | 0.32 | 0.028 |
| 9 | 11.4 | 1310 | 124.8 | 0.176 | 0.32 | 0.2 | 0.009 | 0.31 | 0.025 |
| 10 | 11.5 | 1320 | 124.8 | 0.175 | 0.5 | 0.3 | 0.013 | 0.6 | 0.026 |
| 11 | 11.4 | 1300 | 125 | 0.172 | 0.48 | 0.28 | 0.01 | 0.48 | 0.02 |
| 12 | 11.6 | 1340 | 124.9 | 0.174 | 0.52 | 0.25 | 0.009 | 0.4 | 0.018 |
| 13 | 11.4 | 1300 | 124.6 | 0.177 | 0.32 | 0.11 | 0.002 | 0.18 | 0.007 |
| 14 | 10.3 | 1285 | 125 | 0.176 | 0.4 | 0.18 | 0.009 | 0.23 | 0.01 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A single-mode optical fiber, comprising:
a core layer; and
claddings surrounding the core layer,
wherein a relative refractive index difference Δ1 of the core layer ranges from −0.1% to +0.1%, a radius R1 of the core layer ranges from 4.0 μm to 6.0 μm;
wherein the claddings surrounding the core layer comprises a first cladding layer, a second cladding layer, and a third cladding layer;
wherein the first cladding layer immediately surrounds the core layer, and has a relative refractive index difference Δ2 ranging from −0.2% to −0.6%, and a radius R2 ranging from 10 μm to 22 μm;
wherein the second cladding layer immediately surrounds the first cladding layer, and has a relative refractive index difference Δ3 being less than Δ2, and wherein the relative refractive index difference Δ2 and the radius R2 of the first cladding layer and the relative refractive index difference Δ3 and a radius R3 of the second cladding layer satisfy the relationship of V=(Δ2−Δ3)×(R3−R2), wherein a value of V ranges from 0.15% μm to 0.8% μm; and
wherein the third cladding layer comprises one or more sub-layers immediately surrounding the second cladding layer, and wherein a relative refractive index difference of each sub-layer of the third cladding layer is greater than Δ3.

2. The single-mode optical fiber according to claim 1, wherein the relative refractive index difference Δ3 of the second cladding layer ranges from −0.3% to −0.7%, and the radius R3 of the second cladding layer ranges from 13 μm to 27.5 μm; and
wherein a radius of the outermost sub-layer of the third cladding layer is R4, ranging from 36 μm to 63 μm.

3. The single-mode optical fiber according to claim 1, wherein the core layer is formed by quartz glass doped with fluorine (F) or quartz glass doped with F and another dopant, and wherein a contribution amount of the F in the core layer ranges from −0.1% to 0%.

4. The single-mode optical fiber according to claim 1, wherein the first cladding layer is formed by quartz glass doped with F, wherein a ratio R2/R1 of the radius R2 of the first cladding layer to the radius R1 of the core layer ranges 2 to 4, and a difference value (Δ1−Δ2) between the relative refractive index difference Δ2 of the first cladding layer and the relative refractive index difference Δ1 of the core layer ranges from 0.3% to 0.45%.

5. The single-mode optical fiber according to claim 1, wherein the second cladding layer is formed by quartz glass doped with F, and the relative refractive index difference Δ3 of the second cladding layer is less than that of the other cladding layers.

6. The single-mode optical fiber according to claim 1, wherein the third cladding layer comprises one sub-layer formed of a quartz glass layer doped with F or another dopant, and wherein a relative refractive index difference Δ4 of the third cladding layer ranges from −0.25% to −0.45%.

7. The single-mode optical fiber according to claim 1, wherein the third cladding layer comprises two sub-layers, wherein the inner sub-layer is an F-doped sub-layer with a relative refractive index difference Δ4 ranging from −0.25% to −0.45% and a radius ranging from 36 μm to 54 μm, and wherein the outer sub-layer is a pure silicon sub-layer with a relative refractive index difference being 0%.

8. The single-mode optical fiber according to claim 1, wherein an attenuation coefficient of the optical fiber at a wavelength of 1550 nm less than or equal to 0.180 dB/km, and a mode field diameter of the optical fiber ranges from 10 μm to 13 μm.

9. The single-mode optical fiber according to claim 1, wherein the optical fiber has an optical fiber cutoff wavelength less than or equal to 1530 nm;
wherein at a wavelength of 1550 nm, an added loss for one round of bending at a bending radius of 10 mm is less than or equal to 0.5 dB, and an added loss for ten rounds of bending at a bending radius of 15 mm is less than or equal to 0.2 dB; and
wherein at a wavelength of 1625 nm, an added loss for one round of bending at a bending radius of 10 mm is less than or equal to 1.0 dB, and an added loss for ten rounds of bending at a bending radius of 15 mm is less than or equal to 0.8 dB.

10. The single-mode optical fiber according to claim 1, wherein a micro-bending loss of the optical fiber at 1700 nm is less than or equal to 0.8 dB/km.

11. The single-mode optical fiber according to claim 2, wherein the core layer is formed by quartz glass doped with fluorine (F) or quartz glass doped with F and another dopant, and wherein a contribution amount of the F in the core layer ranges from −0.1% to 0%.

12. The single-mode optical fiber according to claim 2, wherein the first cladding layer is formed by quartz glass doped with F, wherein a ratio R2/R1 of the radius R2 of the first cladding layer to the radius R1 of the core layer ranges 2 to 4, and a difference value (Δ1−Δ2) between the relative refractive index difference Δ2 of the first cladding layer and the relative refractive index difference Δ1 of the core layer ranges from 0.3% to 0.45%.

13. The single-mode optical fiber according to claim 2, wherein the second cladding layer is formed by quartz glass doped with F, and the relative refractive index difference Δ3 of the second cladding layer is less than that of the other cladding layers.

14. The single-mode optical fiber according to claim 2, wherein the third cladding layer comprises one sub-layer formed of a quartz glass layer doped with F or another dopant, and wherein a relative refractive index difference Δ4 of the third cladding layer ranges from −0.25% to −0.45%.

15. The single-mode optical fiber according to claim 2, wherein the third cladding layer comprises two sub-layers, wherein the inner sub-layer is an F-doped sub-layer with a relative refractive index difference Δ4 ranging from −0.25% to −0.45% and a radius ranging from 36 μm to 54 μm, and wherein the outer sub-layer is a pure silicon sub-layer with a relative refractive index difference being 0%.

16. The single-mode optical fiber according to claim 2, wherein an attenuation coefficient of the optical fiber at a wavelength of 1550 nm less than or equal to 0.180 dB/km, and a mode field diameter of the optical fiber ranges from 10 μm to 13 μm.

17. The single-mode optical fiber according to claim 2, wherein the optical fiber has an optical fiber cutoff wavelength less than or equal to 1530 nm;
wherein at a wavelength of 1550 nm, an added loss for one round of bending at a bending radius of 10 mm is less than or equal to 0.5 dB, and an added loss for ten rounds of bending at a bending radius of 15 mm is less than or equal to 0.2 dB; and
wherein at a wavelength of 1625 nm, an added loss for one round of bending at a bending radius of 10 mm is less than or equal to 1.0 dB, and an added loss for ten rounds of bending at a bending radius of 15 mm is less than or equal to 0.8 dB.

18. The single-mode optical fiber according to claim 2, wherein a micro-bending loss of the optical fiber at 1700 nm is less than or equal to 0.8 dB/km.

* * * * *